US007498012B2

(12) United States Patent
Olper et al.

(10) Patent No.: US 7,498,012 B2
(45) Date of Patent: Mar. 3, 2009

(54) DESULFURIZATION PROCESS OF PASTEL AND GRIDS OF LEAD ACCUMULATORS

(75) Inventors: Marco Olper, Monza (IT); Massimo Maccagni, Sesto San Giovanni (IT); Silvano Cossali, Ponte Nossa (IT)

(73) Assignee: ENGITEC S.r.l., Milan (IT)

( * ) Notice: Subject to any disclaimer, the term of this patent is extended or adjusted under 35 U.S.C. 154(b) by 595 days.

(21) Appl. No.: 11/035,001

(22) Filed: Jan. 12, 2005

(65) Prior Publication Data

US 2006/0018819 A1    Jan. 26, 2006

(30) Foreign Application Priority Data

Jul. 20, 2004    (IT)    ............. MI2004A1456

(51) Int. Cl.
*C01G 21/14* (2006.01)
*C01B 31/24* (2006.01)

(52) U.S. Cl. .................. 423/434; 423/89; 423/92; 423/414; 423/415.1; 423/419.1; 423/433

(58) Field of Classification Search ............ 423/89, 423/92, 414, 415.1, 419.1, 433, 434
See application file for complete search history.

(56) References Cited

U.S. PATENT DOCUMENTS 2,152,242 A    3/1939    Curtin 3,892,563 A *  7/1975  La Point ............... 241/20
4,269,810 A    5/1981  Kolakowski
4,769,116 A    9/1988  Olper
6,403,045 B1 * 6/2002  Daviller et al. ............ 423/209

FOREIGN PATENT DOCUMENTS

DE    3612491 A    10/1987
GB    2073725 A    10/1981

* cited by examiner

*Primary Examiner*—Timothy C Vanoy
*Assistant Examiner*—Serena L Hanor
(74) *Attorney, Agent, or Firm*—James V. Costigan; Hedman & Costigan, P.C.

(57) ABSTRACT

The present invention relates to a desulfurization process of pastel and grids of lead accumulators comprising a carbonation in two steps, a granulometric separation between the two steps followed by specific desulfurization of the large part, a desodification obtaining the conversion of the $PbSO_4$ contained in the pastel into $PbCO_3$ which can be easily converted into metallic Pb in an oven by the addition of coal. The system used for the desodification of the large part of the pastel can also be used for the desulfurization of the fine part of the grids.

15 Claims, 3 Drawing Sheets

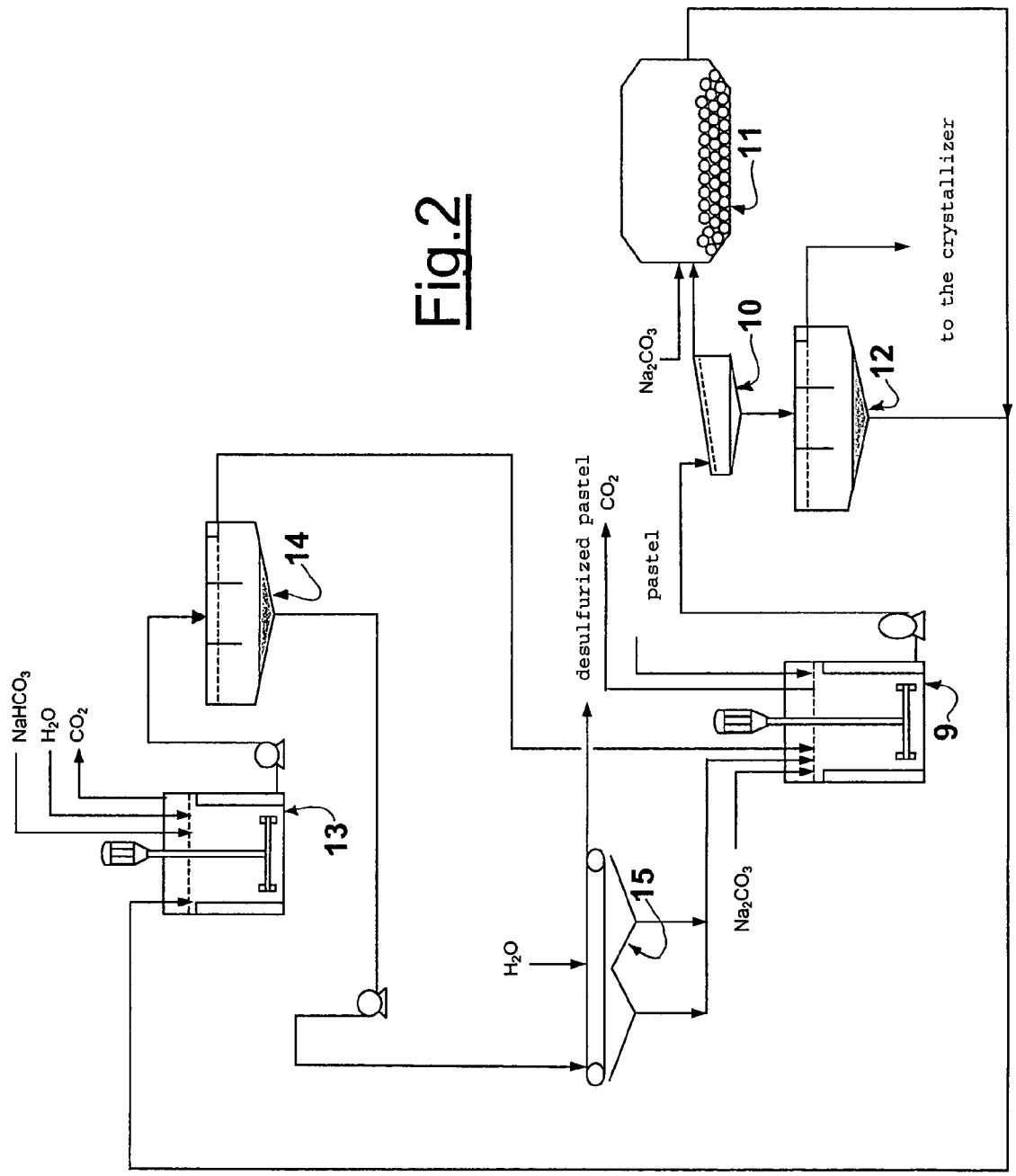

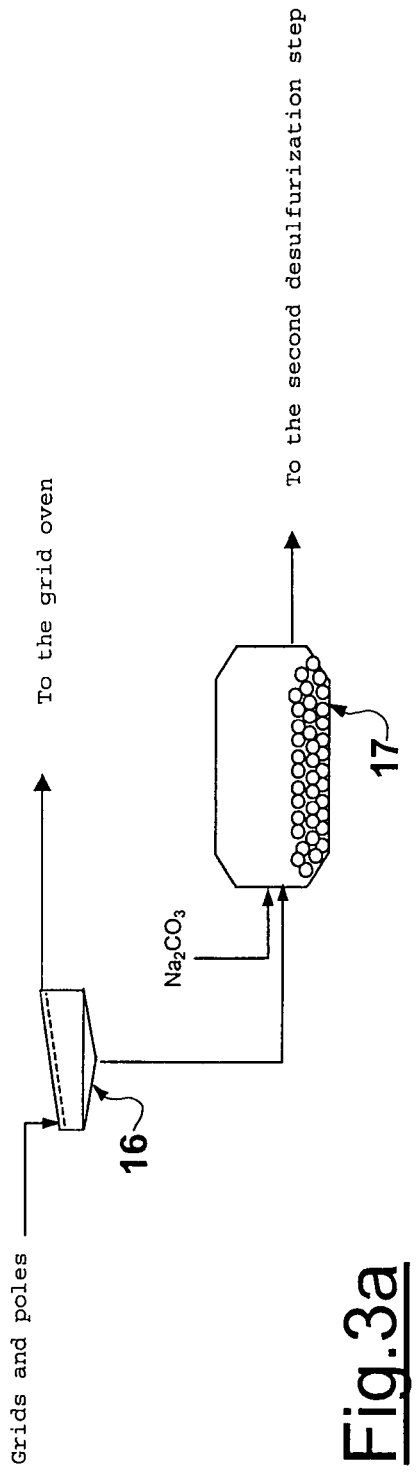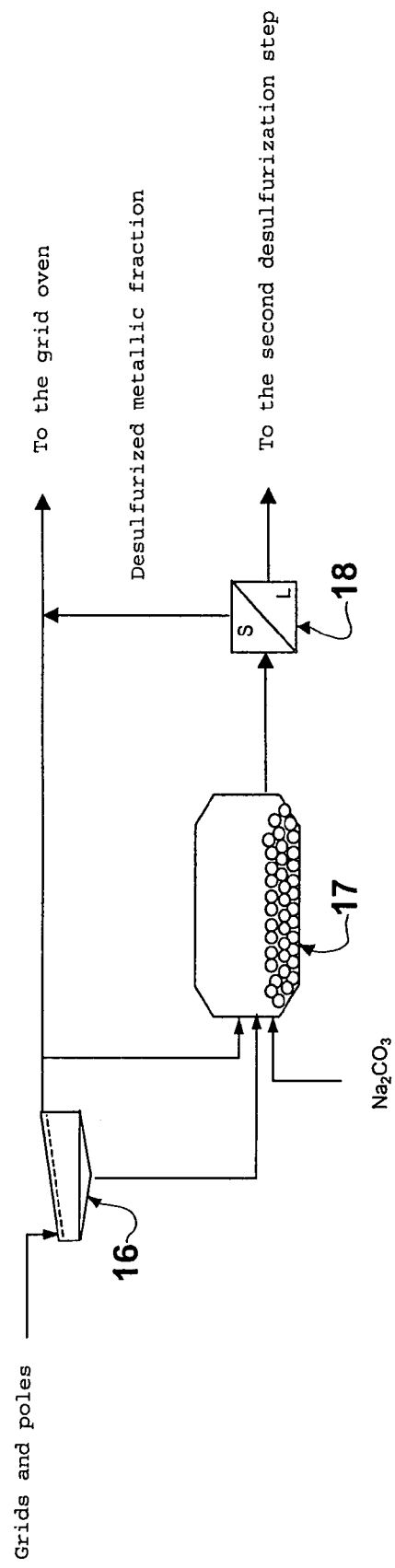

DESULFURIZATION PROCESS OF PASTEL AND GRIDS OF LEAD ACCUMULATORS

The present invention relates to a desulfurization process of the pastel contained in lead accumulators.

The present invention derives from the field of treatment and recycling processes of lead battery components.

Modern treatment processes of lead batteries envisage three main phases:
1) wet grinding of the batteries and separation of the components;
2) treatment of the pastel and neutralization of the electrolyte (diluted sulfuric acid);
3) melting and refining.

In phase 1), the batteries are wet ground and the various fractions are then separated. The fractions recovered mainly consist of the leady fraction, separators and, ebonite, polypropylene and the electrolyte.

The leady fraction is essentially made up of a metallic fraction which comprises the grids and poles, and a paste, called pastel, which forms the active part of the battery applied to the grids, i.e. the part where the charging and discharging reactions take place. The term pastel therefore indicates a mixture of lead compounds such as $PbSO_4$ and $PbO_2$ with smaller quantities of $Pb_2O(SO_4)$, $Pb_2O_3$ and Pb, together with silicates, chalk and other additives. Due to the presence of $PbSO_4$ and $Pb_2O(SO_4)$, the sulfur content of the pastel is high and equal to about 6%. During the thermal production of lead from this fraction, which is carried out under reducing conditions, the sulfate can be reduced to $SO_2$ and this is emitted to the foundry stack.

In phase 2) the pastel is treated by means of two different methods:
a) by desulfurization, wherein the sulfur is eliminated by the addition of alkalis, generally NaOH or $Na_2CO_3$, in order to convert the $PbSO_4$ into lead oxides and/or carbonates thus eliminating the sulfur from the solid. The sulfur is recovered as a solution of sodium sulfate which can then be crystallized and sold
b) by conversion, wherein the sulfur, by the addition of additives, is transformed into sulfurized compounds which remain fixed in the slag during the thermal production of lead.

In phase 3), the metallic fraction and desulfurized pastel are converted into lead which is then refined and alloyed according to refinery demands.

No success has so far been obtained in optimizing phase 2), that relating to the treatment of the pastel.

When resorting to method b), in which desulfurization is not effected, additives are generally added to the pastel, before feeding it to the oven, with the purpose of fixing the sulfur by keeping it in the slag.

Although this operation leads to a considerable reduction in the emissions of $SO_2$, which however still remain extremely significant, it generates a quantity of slag which is proportional to the quantity of additives added.

The most common additives are $Na_2CO_3$, scrap iron and coal. Apart from the coal, which is the reducing agent necessary for converting the lead compounds into metallic lead, the carbonate and iron serve to block the sulfur due to the formation of a ternary matte, having the composition $xNa_2S.yFeS.zPbS$, which, in addition to the sulfur, also entraps the lead which can at times reach high concentrations in the slag itself.

It is also known that, as a result of the formation of this slag, the temperature to be reached in the oven for producing lead is higher, as it melts at higher temperatures than lead, thus increasing the energy requirements of the oven itself. In addition to this, the slag occupies a part of the oven which could be used for the production.

A last but not less important problem is the quality of the slag which, as already mentioned, contains quite significant quantities of lead making it difficult to dispose of.

There are also drawbacks when resort is made to the treatment of pastel according to the above-mentioned method a), in which desulfurization of the pastel is effected. In this method, the pastel is fed batchwise to a reactor together with alkalis such as $Na_2CO_3$, $(NH_4)_2CO_3$ and NaOH, which act as desulfurizing means. The contact time is generally equal to 1 hour with temperatures ranging from 50-80° C. The desulfurization reactor has the function of both neutralizing the electrolyte ($H_2SO_4$) and desulfurizing the pastel.

From an operative point of view, the electrolyte to be neutralized is charged first, after which an alkaline material is added, generally $Na_2CO_3$ or NaOH, necessary for neutralization and desulfurization in great excess, and finally the pastel to be desulfurized.

There are generally the following three reactions, in relation to the alkalis used:

using $Na_2CO_3$:

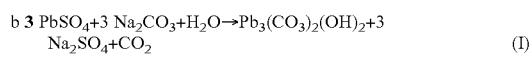

(I)

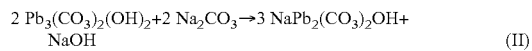

(II)

using NaOH:

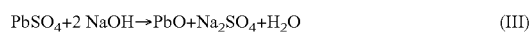

(III)

Desulfurization with sodium carbonate generally has a sulfur removal yield ranging from 85 to 90% and provides a mixture of basic carbonates as per reactions 1) and 2).

The ratio between the two carbonates essentially depends on the operative conditions, i.e.: temperature, final concentration of sodium sulfate and excess sodium carbonate. In order to have a desulfurization at the levels indicated, it is necessary to operate with an abundant excess of reagent (>10%) which increases the content of $NaPb_2(CO_3)_2OH$ with respect to the $Pb_3(CO_3)_2(OH)_2$.

The greatest difficulty, however, is linked to the presence of large particles coming from corrosion products of the internal part of the grids and agglomerations of pastel particles which are difficult to desulfurize in traditional reactors and which represent, in relation to the separation system used after the grinding of the batteries, from 15 to 35% of the total pastel. The presence of this material, which is extremely difficult to desulfurize with traditional means, is responsible for a sulfur content in the final desulfurized pastel equal to 0.4-0.8%.

The fine part of the grids, however, at the outlet of the separation unit, is not only to be found in the pastel but also contaminates the metallic fraction (grids and poles) by the introduction of a quantity of sulfur which causes problems with the emissions during thermal reduction in the oven. This aspect must also be taken into consideration for obtaining the complete desulfurization of the leady materials fed to the oven.

The final sodium sulfate solution of the desulfurization process, containing excess non-reacted carbonate, is then transferred to a second reactor to be subsequently neutralized. During this phase, the drawback can arise of the formation of further precipitates which also require separation in an additional filtration unit.

The formation of $NaPb_2(CO_3)_2OH$ further complicates the sodium balance as the sodium blocked in the basic lead carbonate is not converted into sodium sulfate but is lost during the production of lead in the oven. This also contributes to the formation of slag.

The desulfurized pastel is in contact with a solution of sodium sulfate at 18-20% and the subsequent filtration phase in a filter-press of this dispersion leaves about 12% of solution imbibed in the final cake. With the present use of filter-presses, an effective washing of the desulfurized pastel is not obtained and this means having a residual sulfur content in the final cake which can vary from 0.5 to 0.8%. This residual sulfur can in fact be mainly attributed to $Na_2SO_4$ left by the desulfurization reaction in the imbibed solution, regardless of the desulfurization yields.

Desulfurization with the addition of NaOH proves to be even more difficult to handle as any excess of reagent leads to the dissolution of the lead as hydroxy-plumbite:

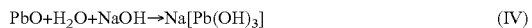

$$PbO+H_2O+NaOH \rightarrow Na[Pb(OH)_3] \qquad (IV)$$

Under these conditions it becomes difficult to establish the end of the reaction and consequently the excess of reagent added.

This method has the further disadvantage of requiring a separate filtration unit as in the neutralization phase, all the metals which have been dissolved by the excess reagent, among which the lead itself, precipitate in quite significant quantities. Even with this approach, however, the sodium balance is invalidated by the formation of hydroxy-plumbite in the solid phase. Furthermore, as the residual humidity is slightly higher after filtration than with the use of $Na_2CO_3$, the quantity of soluble sulfur (imbibed) in the final cake is also higher.

The necessity is therefore currently felt for availing of a process for the desulfurization of pastel and fine fractions of grids with a high sulfur content of lead accumulators which is highly efficient as a result of the optimization of the use of the reagents.

One of the main objectives of the present invention therefore consists in providing a desulfurization process which causes an effective removal of sulfur from pastel and the fine part of grids, together with an almost complete removal of the sodium, so as to minimize the occurrence of drawbacks in the plants downstream of the desulfurization section.

A further objective of the present invention consists in providing a desulfurization process of the pastel and fine fractions of grids contained in lead accumulators which is capable of minimizing the sodium content in the final cake, thus reducing the formation of slag.

In view of these objectives and others which will appear evident hereunder, in accordance with a first aspect of the present invention, a desulfurization process is provided, of the pastel and/or fine parts of grids contained in lead accumulators as disclosed in claim 1 enclosed.

Further characteristics of the invention are specified in the subsequent claims.

In accordance with an aspect of the invention, a desulfurization process is provided, of material containing $PbSO_4$, in particular grids and pastel contained in lead accumulators, comprising a desulfurization in two phases, wherein, in the first phase, the lead sulfate of the pastel/grids is put in contact with $Na_2CO_3$ to react according to the following reactions:

$$3\ PbSO_4+3\ Na_2CO_3+H_2O \rightarrow Pb_3(CO_3)_2(OH)_2+3\ Na_2SO_4+CO_2 \qquad (I)$$

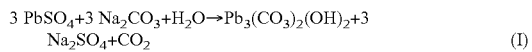

$$2\ Pb_3(CO_3)_2(OH)_2+2\ Na_2CO_3 \rightarrow 3\ NaPb_2(CO_3)_2OH+NaOH \qquad (II)$$

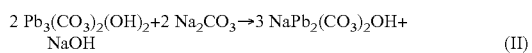

in the second phase, the residues formed are reacted i) with further $Na_2CO_3$ according to the above reactions, or, alternatively, ii) with $NaHCO_3$ according to the following reaction $$PbSO_4+2\ NaHCO_3 \rightarrow PbCO_3+Na_2SO_4+CO_2+H_2O \qquad (V)$$

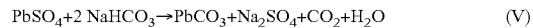

$$Pb_3(CO_3)_2(OH)_2+2\ NaHCO_3 \rightarrow 3\ PbCO_3+Na_2CO_3+2\ H_2O \qquad (VI)$$

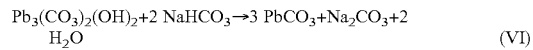

$$NaPb_2(CO_3)_2OH+NaHCO_3 \rightarrow 2\ PbCO_3+Na_2CO_3+H_2O \qquad (VII)$$

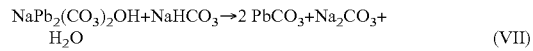

$$Na_2CO_3+CO_2+H_2O \rightarrow 2\ NaHCO_3 \qquad (VIII)$$

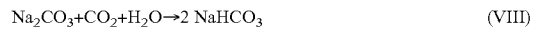

In the first step or desulfurization phase, a solution coming from the filtration of the desulfurized pastel and the clarified product coming from the decanter situated after the reactor of the second desulfurization phase, conveniently flow in addition to the pastel.

Between the two phases, a separation is generally effected, of the large part of the pastel, obtained by wet sieving the dispersion deriving from the first phase. The large part is recovered at the top of the sieve and is fed to a specific reactor to be desulfurized according to the requirements of the process with NaOH or $Na_2CO_3$ according to the reactions described above. The dispersion resulting from this operation is joined to the thickened product at the bottom of the sieve (fine part) and fed to the second desulfurization phase, re-inserting the large part into the rest of the treatment cycle. The same reactor and chemistry also form an effective means for the desulfurization of the fine part of the grids which contains a considerable quantity of sulfur coming from the corrosion products of the inner part of the grids.

In the carbonate-based system (i), a desodification phase is typically effected, wherein the sodium contained in the pastel is recovered according to the following reactions:

$$Pb_3(CO_3)_2(OH)_2+CO_2 \rightarrow 3\ PbCO_3+H_2O \qquad (IX)$$

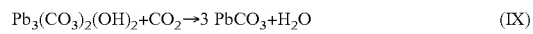

$$NaPb_2(CO_3)_2OH+CO_2 \rightarrow 2\ PbCO_3+NaHCO_3 \qquad (X)$$

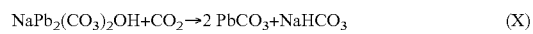

An embodiment therefore envisages a forced desulfurization in a two-step unit in order to minimize to the utmost the sulfur content in the desulfurized pastel and/or in the grids (in particular in the fine part) and the recovery of the sodium contained in the final cake, also minimizing the quantity of reagents used for the desulfurization. This means aiming at the theoretical system defined by the reaction:

$$PbSO_4+Na_2CO_3 \rightarrow PbCO_3+Na_2SO_4 \qquad (XI)$$

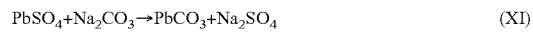

According to an embodiment, the process of the invention comprises a first desulfurization phase in which the pastel is put in contact with the solution coming from the second phase, a separation phase of the large pastel with its desulfurization, a second desulfurization phase in which the thickened product deriving from the sedimentation of the fine product of the first phase and the large desulfurized product of the first phase, are put in contact with a solution of $Na_2CO_1$ and a desodification phase wherein the thickened product in the second desulfurization phase is put in contact with $CO_2$. The $CO_2$ used in the desodification phase is conveniently that generated in the same plant in the desulfurization reactors.

The characteristics and advantages of a desulfurization process of the pastel contained in lead accumulators according to the present invention will appear more evident from the following illustrative and non-limiting description, referring to the enclosed schematic drawings, in which:

FIG. 2 illustrates a flow scheme of an embodiment of the process of the invention wherein the second desulfurization phase is effected by reaction with $NaHCO_3$.

FIG. 3 illustrates a flow scheme of a preferred embodiment of a part of the process of the invention which describes the treatment of a fine fraction of the grids of the accumulators.

Figure 1:
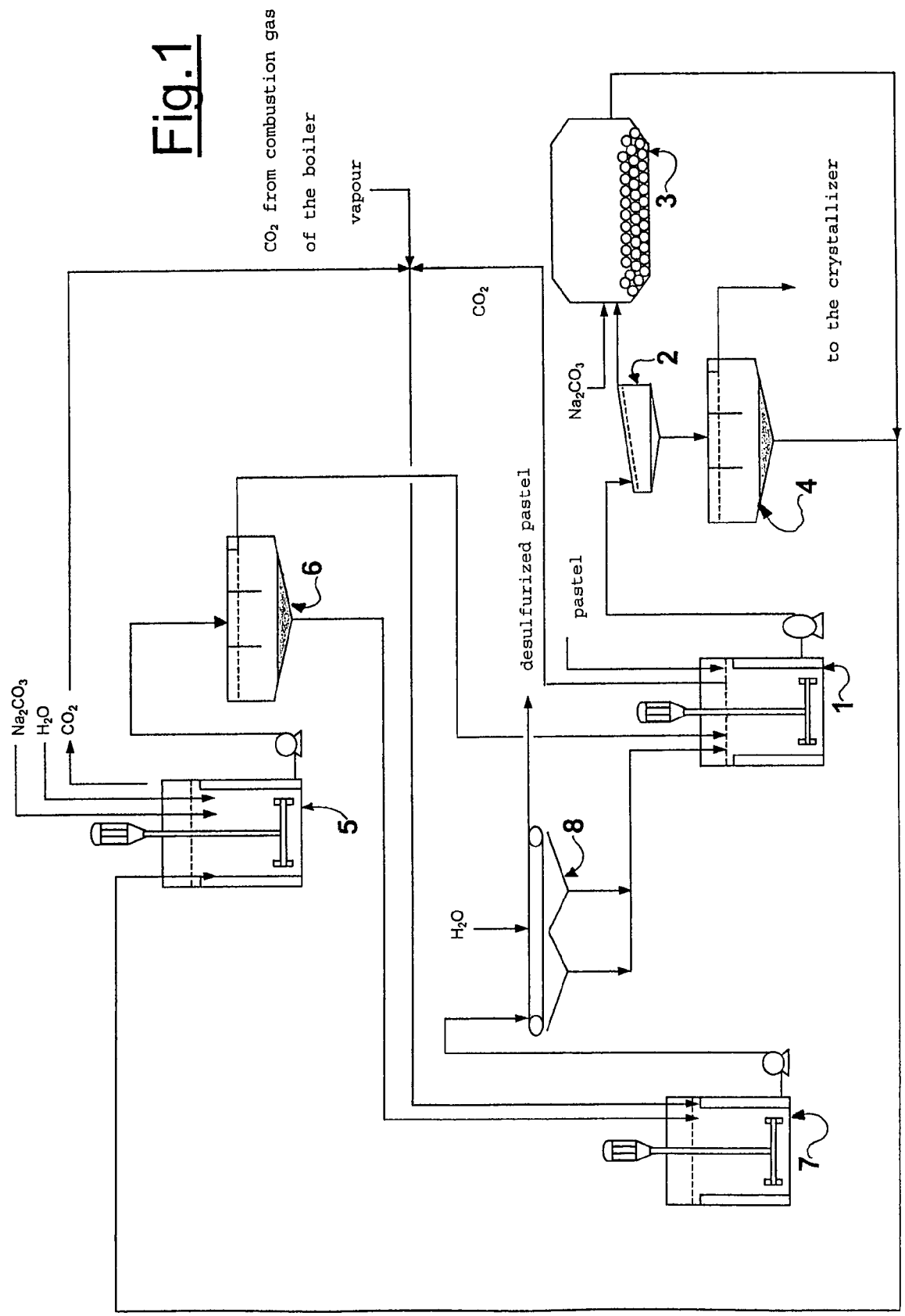
FIG. 1 illustrates a flow scheme of an embodiment of the invention wherein the two desulfurization phases are effected by reaction with $Na_2CO_3$.

With reference to FIG. 1, this shows an embodiment of the two-phase desulfurization process.

In particular, the pastel initially fed to a reactor 1 is reacted with $Na_2CO_3$. A dispersion containing a solid in which only part of the $PbSO_4$ has reacted, due to the lack of carbonates, leaves this reactor, and is transformed into $PbCO_3$, according to the reaction (XI), completely using up the carbonates and leaving only $Na_2SO_4$ in solution. This dispersion is fed to a sieve 2 where there is the separation of the large part of the pastel from the fine part of the pastel.

The large part, collected at the top of the sieve, which can comprise grid components, is fed to a specific reactor 3 where it is desulfurized alone according to the reactions (I) and (II) indicated above. The reactor 3 can also be a traditional stirred reactor fed with WaCH instead of $Na_2CO_3$ where the reaction (III) takes place. The dispersion containing the fine part (of pastel/grids) is sent to a decanter 4 where the clarified product comprises a solution of sodium sulfate ready to be sent to the crystallization section, whereas the thickened product is fed to the reactor 5 together with the dispersion produced in the reactor 3. The second desulfurization phase takes place in the reactor 5, according to the reactions (I) and (II) by putting the above-mentioned dispersions in contact with $Na_2CO_1$.

The dispersion leaving the reactor 5 is sent to the decanter 6. From this, the clarified product separated is fed to the reactor 1, whereas the thickened product is fed to the sodium removal reactor 7. In this reactor, as a result of the action of the $CO_2$ and according to the reactions (IX) and (X), the sodium contained in the desulfurized pastel is extracted in the form of $NaHCO_3$, which can be used in the reactor 1 for the desulfurization, transforming all the various basic lead carbonates into $PbCO_3$.

The dispersion leaving the reactor 7 is fed to the filter 8, for example a full flat vacuum filter producing a cake or desulfurized pastel practically sulfur-free, optionally washed, preferably in countercurrent to reduce the content of imbibed salts and consequently sodium. The definitively desulfurized pastel is recovered ready to be sent to the oven for the production of metallic lead. The filtrate, which is simply a solution of sodium sulfate containing the excess bicarbonate produced in the reactor 7, can be fed to the initial step 1 of the process, recovering the carbonates contained in the desulfurization.

With reference to FIG. 2, this shows an embodiment of the two-phase desulfurization process, which envisages a first desulfurization phase in which the pastel is put in contact with $Na_2CO_3$ and/or $NaHCO_3$ and a second desulfurization phase in which the product resulting from the first phase is put in contact with $NaHCO_3$. The reagent $Na_2CO_3$ is conveniently fed to the reactor 9 to be subsequently added in defect with respect to the pastel, which is also added to the same reactor where the first desulfurization phase takes place. The filtrate coming from the filtration of the desulfurized pastel is also conveniently fed to the reactor 9. Reaction (XI) described above takes place under these conditions.

According to an embodiment, a defect of 5-50% by weight of a carbonate, preferably 5-15%, 10% being the optimal amount, is added to the $PbSO_4$.

The final dispersion produced in the reactor 9 is fed to a sieve 10 where the large part of the pastel is separated from the dispersion containing the fine part of the pastel. The large part (containing grids), collected at the top of the sieve, is fed to a specific reactor 11 where it is desulfurized alone according to reactions (I) and (II) indicated above. Also in this case, the reactor 11 can be a traditional stirred reactor fed with NaOH instead of $Na_2CO_3$ where reaction (III) takes place. The dispersion containing the fine part (of pastel/grids) is sent to a decanter 12 where the clarified product comprises a solution of sodium sulfate ready to be sent to the crystallization section, whereas the thickened product is fed to the reactor 13 together with the dispersion produced in the reactor 11. In the reactor 13, the dispersion is put in contact with an excess of $NaHCO_3$ converting the residual $PbSO_4$ in the solid to $PbCO_3$ according to reaction (V). The dispersion obtained is sent to a decanter 14 where a clarified product is separated which, as already mentioned, is fed to the reactor 9, together with a thickened product which contains completely desulfurized pastel. The thickened product is fed to the filter 15, for example a full flat vacuum filter, producing a cake or practically sulfur-free desulfurized pastel optionally washed preferably in countercurrent to reduce the content of imbibed salts. The definitively desulfurized pastel is recovered ready to be sent to the oven for the production of metallic lead. The filtrate, which is substantially simply a solution containing excess bicarbonate fed to the reactor 13, can be fed to the initial step of the process, recovering the carbonates.

It has been verified that with a suitable washing after filtration, the soluble sulfur content can be reduced to practically zero, thus bringing the total sulfur (soluble and insoluble) to negligible concentrations. In particular, the soluble sulfur is reduced to a content of less than 0.1% by weight.

This can be obtained, for example, by a countercurrent multi-step washing/decanting or by the use of flat continuous filters.

The final result is a pastel in which there is the almost total conversion of the $PbSO_4$ contained therein to $PbCO_3$. In order to be converted in an oven to metallic lead, this compound only requires the addition of coal as reducing agent.

With reference to FIG. 3, this illustrates an embodiment of the desulfurization system of the fine part of grids, for the quantity that is found in the metallic fraction, comprising grids and poles, which can be integrated with the pastel desulfuration flow sheet providing a definitive solution to the problem of sulfur content in the treatment of the leady compounds of lead accumulators at the end of their life cycle.

After sieving the grids, conveniently from 0.1 to 2 mm, preferably from 0.5 to 1.2 mm, 1 mm being the optimum, with the sieve 16, the fine part can be ground in a mill in two ways:
a) by previously charging 17 metallic spheres (ball mill) into the mill, and putting the fine part in contact with a solution of $Na_2CO_3$.
b) by previously charging 17 large pieces of grids and poles (autogenous mill) into the mill, and putting the fine part in contact with a solution of $Na_2CO_3$.

The dispersion produced with approach a) is conveniently fed to the reactor of the second pastel desulfurization phase and subsequently following the cycle until its completion.

The dispersion produced with approach b) is typically fed to a solid/liquid separator 18. The solid, comprising metallic compounds of desulfurized lead, is fed directly to the reduction oven for producing metal, whereas the liquid is fed to the reactor of the second desulfurization phase of the pastel and subsequently following the cycle until its completion.

The embodiment of the process of the invention has considerable advantages both from a production and ecological point of view.

Having reduced the total sulfur to minimum quantities, there is a minimum need for additives during the lead production phase in the oven (<5%). This minimization of the sulfur content, together with the minimization in the sodium content, makes the quantity of slag to be discharged negligible.

There are two main advantages in reducing the slag in this way:

greater space in the oven which can be used for the production, thanks to the space no longer occupied by slag, lower quantity of energy to be supplied to the oven as the melting point is lowered by about 200° C., combined with an almost total abatement of the $SO_2$ emissions from the stack.

Furthermore, the process of the invention allows the treatment costs to be minimized both by optimizing the consumption of additives in the desulfurization phase and by minimizing melting additives in the oven with the almost total recovery of the sodium as sulfate. At the end of the treatment, moreover, the water balance remains practically unaltered.

The process of the invention can also be applied to any material containing $PbSO_4$ and which necessitates thermal treatment for producing metallic lead.

The following examples are provided for purely illustrative purposes of the present invention and should in no way be considered as limiting its protection scope as specified in the enclosed claims.

EXAMPLE 1

47.5 kg of a solution, used in a previous test, and having the following composition, are present in a typical CX reactor (battery breakage and separation with desulfurization):

| | |
|---|---|
| $H_2O$ | 80.8% |
| $NaHCO_3$ | 4.3% |
| $Na_2SO_4$ | 14.9% | in which 20 kg of pastel are fed, having the following composition (with respect to the dry product):

| | |
|---|---|
| $PbSO_4$ | 60.0% |
| $PbO_2$ | 25.0% |
| PbO | 8.0% |
| Metallic Pb | 3.0% |
| Other | 4.0% |

The reactor is left under stirring for 1 h at 70° C. after which the final dispersion is passed over a sieve with a 76 micron net, whereby a large fraction equal to about 5 kg is separated and is then fed to a ball mill with 6 kg of a solution of $Na_2CO_3$ having the following composition:

| | |
|---|---|
| $H_2O$ | 82.3% |
| $Na_2CO_3$ | 16.7% |

The mixture is left to react in the mill for 30 minutes at 70° C. In the meantime, the dispersion passed under the sieve is decanted. 31 kg of clarified solution having the following composition are siphoned:

| | |
|---|---|
| $H_2O$ | 82.0% |
| $Na_2SO_4$ | 18.0% |

The thickened product, residing in the reactor, is joined with the dispersion coming from the ball mill together with 8 kg of water and 3.2 kg of $Na_2CO_3$. The mixture is brought to 70° C. and is left under stirring for 1 hour. The final dispersion is decanted, recovering 16.9 kg of clarified product having the following composition:

| | |
|---|---|
| $H_2O$ | 77.6% |
| $NaHCO_3$ | 1.2% |
| $Na_2SO_4$ | 21.2% | which is recycled in the subsequent test to the first desulfurization step.

The thickened product remaining in the reactor is reacted with 940 g of $CO_2$ fed by a cylinder through a gas diffuser.

The final dispersion is filtered on a flat vacuum filter and the residue is washed with 18.6 kg of water. 30.6 kg of filtrate having the following composition are recovered from the filtration operation:

| | |
|---|---|
| $H_2O$ | 82.6% |
| $NaHCO_3$ | 6.0% |
| $Na_2SO_4$ | 11.4% | and 24.8 kg of residue, having the following composition:

| | |
|---|---|
| $PbCO_3$ | 42.49% |
| $PbSO_4$ | 0.12% |
| $PbO_2$ | 20.14% |
| PbO | 6.45% |
| Metallic Pb | 2.42% |
| $H_2O$ | 24.95% |
| $NaHCO_3$ | 0.07% |
| $Na_2SO_4$ | 0.14% |
| Other | 3.22% |

The solution is recycled to the first desulfurization phase of the next cycle.

After drying, the desulfurized pastel has the following composition:

| | |
|---|---|
| $PbCO_3$ | 56.61% |
| $PbSO_4$ | 0.16% |
| $PbO_2$ | 26.84% |
| PbO | 8.60% |
| Metallic Pb | 3.22% |
| $NaHCO_3$ | 0.09% |
| $Na_2SO_4$ | 0.19% |
| Other | 4.29% |

The results showed a desulfurization equal to 99.5% (insoluble sulfur=0.017%, soluble sulfur=0.041%, total sulfur=0.058%) and a sodium recovery equal to 99.1%.

EXAMPLE 2

39.9 kg of a solution coming from previous tests, and having the following composition, are present in a typical CX reactor (battery breakage and separation with desulfurization):

| | |
|---|---|
| $H_2O$ | 90.8% |
| $NaHCO_3$ | 0.3% |
| $Na_2SO_4$ | 8.9% |

20 kg of pastel are also fed, having the following composition (with respect to the dry product):

| | |
|---|---|
| $PbSO_4$ | 60.0% |
| $PbO_2$ | 25.0% |
| $PbO$ | 8.0% |
| Metallic Pb | 3.0% |
| Other | 4.0% |

1.7 kg of water and 2.5 kg of $Na_2CO_3$. The reactor is left under stirring for 1 h at 70° C. after which the final dispersion is passed over a sieve with a 76 micron net whereby a large fraction equal to about 4.8 kg is separated and is then fed to a ball mill with 5.9 kg of a solution of $Na_2CO_3$ having the following composition:

| | |
|---|---|
| $H_2O$ | 82.3% |
| $Na_2CO_3$ | 16.7% |

The mixture is left to reactor in the mill for 30 minutes at 70° C. In the meantime, the dispersion passed under the sieve is decanted. 31.2 kg of clarified solution having the following composition are siphoned:

| | |
|---|---|
| $H_2O$ | 82.0% |
| $Na_2SO_4$ | 18.0% |

The thickened product, residing in the reactor, is joined with the dispersion coming from the ball mill together with 6.3 kg of water and 1.1 kg of $NaHCO_3$. The mixture is brought to 70° C. and is left under stirring for 1 hour.

The final dispersion is filtered on a flat vacuum filter and the residue is washed with 18.6 kg of water.

39.9 kg of filtrate having the following composition are recovered from the filtration operation:

| | |
|---|---|
| $H_2O$ | 90.8% |
| $NaHCO_3$ | 0.3% |
| $Na_2SO_4$ | 8.9% | and 24.9 kg of residue, having the following composition:

| | |
|---|---|
| $PbCO_3$ | 42.43% |
| $PbSO_4$ | 0.24% |
| $PbO_2$ | 20.17% |
| $PbO$ | 6.45% |
| Metallic Pb | 2.42% |
| $H_2O$ | 24.98% |
| $NaHCO_3$ | 0.00% |
| $Na_2SO_4$ | 0.07% |
| Other | 3.23% |

The solution is recycled to the first desulfurization phase of the next cycle.

After drying, the desulfurized pastel has the following composition:

| | |
|---|---|
| $PbCO_3$ | 56.56% |
| $PbSO_4$ | 0.32% |
| $PbO_2$ | 26.88% |
| $PbO$ | 8.60% |
| Metallic Pb | 3.23% |
| $NaHCO_3$ | 0.00% |
| $Na_2SO_4$ | 0.19% |
| Other | 4.31% |

The results showed a desulfurization equal to 99.4% (insoluble sulfur=0.035%, soluble sulfur=0.022%, total sulfur=0.057%) and a sodium recovery equal to 99.7%.

EXAMPLE 3

Only the large part of the pastel is desulfurized, which, upon wet sieving, revealed a sulfur content equal to 3.12%. 2 kg of this material are treated in a ball mill with 3 kg of a solution of $Na_2CO_3$ having the following composition:

| | |
|---|---|
| $H_2O$ | 83.3% |
| $NaHCO_3$ | 16.7% |

The mixture is left to react at 70° C. for 1 h and is then discharged from the mill, the dispersion obtained is filtered on a flat vacuum filter.

2469 g of wet solid having the following composition, are recovered:

| | |
|---|---|
| $Pb_2OSO_4$ | 1.00% |
| $NaPb_2(CO_3)_2OH$ | 44.02% |
| $H_2O$ | 14.73% |
| $Na_2CO_3$ | 0.20% |
| $NaOH$ | 0.03% |
| $Na_2SO_4$ | 0.33% |
| Other | 39.51% | and 2525 g of solution with the following composition:

| | |
|---|---|
| $H_2O$ | 82.35% |
| $Na_2CO_3$ | 6.32% |
| $NaOH$ | 0.97% |
| $Na_2SO_4$ | 10.36% |

The results showed a desulfurization equal to 96.7% (insoluble sulfur=0.07%, soluble sulfur=0.09%, total sulfur=0.16%).

EXAMPLE 4

A sample of fine grids (<1 mm) is desulfurized, having a sulfur content equal to 3.85%. 2 kg of this material are treated in a ball mill with 2 kg of a solution of $Na_2CO_3$ having the following composition:

| | |
|---|---|
| $H_2O$ | 87.5% |
| NaOH | 12.5% |

The mixture is left to react at 70° C. for 1 h and is then discharged from the mill, the dispersion obtained is filtered on a flat vacuum filter.

2263 g of wet solid having the following composition, are recovered:

| | |
|---|---|
| $Pb_2OSO_4$ | 0.82% |
| NaPbOOH | 11.12% |
| PbO | 28.28% |
| $H_2O$ | 16.24% |
| $Na_2CO_3$ | 0.20% |
| NaOH | 0.08% |
| $Na_2SO_4$ | 0.36% |
| Other | 43.11% | and 2886 g of solution with the following composition:

| | |
|---|---|
| $H_2O$ | 84.92% |
| NaOH | 5.95% |
| $Na_2SO_4$ | 9.13% |

The results showed a desulfurization equal to 98.2% (insoluble sulfur=0.06%, soluble sulfur=0.10%, total sulfur=0.16%).

EXAMPLE 5

The same large part as Example 3 is desulfurized, but this time with NaOH in a simple stirred reactor. 2 kg of this material are treated in a typical CX stirred reactor with 2 kg of a solution of $Na_2CO_3$ having the following composition:

| | |
|---|---|
| $H_2O$ | 87.5% |
| NaOH | 12.5% |

The mixture is left to react at 70° C. for 1 h and the dispersion obtained is filtered on a flat vacuum filter.

2320 g of wet solid having the following composition, are recovered:

| | |
|---|---|
| Solid from grid desulfurization | 90.84% |
| $H_2O$ | 8.50% |
| $Na_2CO_3$ | 0.20% |
| NaOH | 0.04% |
| $Na_2SO_4$ | 0.42% | and 2673 g of solution with the following composition:

| | |
|---|---|
| $H_2O$ | 83.61% |
| NaOH | 1.10% |
| $Na_2SO_4$ | 11.71% |
| $Na_2CO_3$ | 3.56% |

The results showed a desulfurization equal to 94.6% (insoluble sulfur=0.20%, soluble sulfur=0.10%, total sulfur=0.30%).

EXAMPLE 6

A mixture of the fine part of grids (<1 mm) is desulfurized, which, upon wet sieving, revealed a sulfur content equal to 3.85%, in a mill into which, instead of balls, 4 kg of large grids (>2 mm), which, when wet sieved, revealed a sulfur content equal to 0.07%.

2 kg of fines (fine grain sized fraction) are treated with 3.9 kg of a solution of $Na_2CO_3$ having the following composition:

| | |
|---|---|
| $H_2O$ | 83.3% |
| $NaHCO_3$ | 16.7% |

The mixture is left to react at 70° C. for 1 h and is then discharged from the mill, the dispersion obtained is filtered on a flat vacuum filter.

6699 g of wet solid having the following composition, are recovered:

| | |
|---|---|
| Solid from grid desulfurization | 91.20% |
| $H_2O$ | 8.53% |
| $Na_2CO_3$ | 0.11% |
| NaOH | 0.01% |
| $Na_2SO_4$ | 0.15% | and 3193 g of solution with the following composition:

| | |
|---|---|
| $H_2O$ | 81.74% |
| $Na_2CO_3$ | 7.42% |
| NaOH | 0.93% |
| $Na_2SO_4$ | 9.91% |

The results showed a desulfurization equal to 92.3% (insoluble sulfur=0.10%, soluble sulfur=0.10%, total sulfur=0.20%).

We claim:

1. A desulfurization process of a pastel and/or grids contained in lead accumulators characterized in that it comprises a desulfurization in two phases, wherein, in the first phase the lead sulfate of the pastel is put in contact with $Na_2CO_3$ in solution to react according to the following reaction:

$$3\ PbSO_4 + 3\ Na_2CO_3 + H_2O \rightarrow Pb_3(CO_3)_2(OH)_2 + 3\ Na_2SO_4 + CO_2 \quad (I)$$

$$2\ Pb_3(CO_3)_2(OH)_2 + 2Na_2CO_3 \rightarrow 3\ NaPb_2(CO_3)_2OH + NaOH \quad (II)$$

providing a dispersion comprising a carbonated pastel based on basic lead carbonates and thereafter decanting the dispersion obtained from the first phase to recover a carbonated pastel based on basic lead carbonates and a basic solution containing $Na_2CO_3$ which is neutralized with a solution based on $H_2SO_4$ to produce $CO_2$ according to the reaction:

$$Na_2CO_3 + H_2SO_4 \rightarrow Na_2SO_4 + CO_2 + H_2O \quad (V)$$

which, in a second phase, is reacted with $CO_2$ according to the following reaction:

$$Pb_3(CO_3)_2(OH)_2 + CO_2 \rightarrow 3\, PbCO_3 + H_2O \quad (VII)$$

$$NaPb_2(CO_3)_2OH + CO_2 \rightarrow 2\, PbCO_3 + NaHCO_3 \quad (VIII)$$

to give a dispersion comprising a desulfurized pastel based on $PbCO_3$.

2. The process according to claim 1, wherein in the first desulfurization phase, the lead sulfate of the pastel is put in contact with an excess quantity of $Na_2CO_3$ with respect to the theoretical amount for its desulfurization.

3. The process according to claim 1, wherein the $CO_2$ produced by the neutralization of said basic solution is used as reagent in the second desulfurization phase.

4. The process according to claim 1, wherein said solution based on $H_2SO_4$ is a battery electrolyte.

5. The process according to claim 1, wherein said basic solution is filtered to separate a solution based on $Na_2SO_4$ which is transferred to a crystallizer and a solution based on $Na_2CO_3$ which is recycled to the first desulfurization phase.

6. The process according to claim 1, wherein the dispersion comprising the desulfurized pastel based on $PbCO_3$ obtained from the second desulfurization phase, is filtered and/or washed to reduce the content of imbibed salts and separate a desulfurized pastel based on $PbCO_3$ and a basic solution.

7. The process according to claim 6, wherein said basic solution contains $Na_2CO_3$ and $NaHCO_3$ and is recycled to a new desulfurization cycle by passing said basic solution to the frist desulfurization phase.

8. The process according to claim 1, further comprising between the two desulfurization phases of the pastel, an intermediate desulfurization phase of the fine part of grids of accumulators.

9. The process according to claim 8, wherein said intermediate desulfurization phase comprises a grinding of the fine part of the grids inside a mill containing a solution of $Na_2CO_3$.

10. The process according to claim 8, wherein said intermediate desulfurization phase of the fine part of grids of accumulators comprises (i) a sieving of the dispersion coming from the first desulfurization phase to separate the fine part of the grids, (ii) the feeding of said fine part of the grids to a mill with a solution of $Na_2CO_3$ and (iii) the grinding of said fine part to give a dispersion which is fed to the second desulfurization phase.

11. The process according to claim 10, wherein said grinding (iii) takes place in a mill fed with pieces of poles and grids of accumulators and wherein the dispersion formed is fed to a solid/liquid separator in which the following components are separated: a) a solid component comprising metallic components of desulfurized lead which is transferred to a reduction oven; b) a liquid component which is fed to the second desulfurization phase of the process.

12. The process according to claim 1, wherein said first and/or said second desulfurization phase are effected for a time ranging from 30-180 minutes.

13. The process according to claim 12, wherein said first and/or second desulfurization phase are effected for a time ranging from 60 to 120 minutes.

14. The process according to claim 1, wherein said first and/or said second desulfurization phase are effected at a temperature ranging from 30 to 90° C.

15. The process according to claim 14, wherein said first and/or said second desulfurization phase are effected at a temperature ranging from 60 to 80° C.

* * * * *